(12) United States Patent
Dariavach et al.

(10) Patent No.: US 10,639,714 B2
(45) Date of Patent: May 5, 2020

(54) APPLYING ELECTRIC PULSES THROUGH A LASER INDUCED PLASMA CHANNEL FOR USE IN A 3-D METAL PRINTING PROCESS

(71) Applicant: GENERAL ELECTRIC COMPANY, Schenectady, NY (US)

(72) Inventors: Nader Dariavach, Lake Worth, FL (US); Michel Engelhardt, Woodbury, NY (US); Nicholas Williams, Wellington, FL (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 15/794,854

(22) Filed: Oct. 26, 2017

(65) Prior Publication Data
US 2019/0126348 A1    May 2, 2019

(51) Int. Cl.
| | |
|---|---|
| *B22F 3/105* | (2006.01) |
| *B23K 10/02* | (2006.01) |
| *B33Y 10/00* | (2015.01) |
| *B33Y 30/00* | (2015.01) |
| *B23K 26/342* | (2014.01) |
| *B23K 26/346* | (2014.01) |

(Continued)

(52) U.S. Cl.
CPC ............ *B22F 3/1055* (2013.01); *B22F 3/105* (2013.01); *B23K 10/027* (2013.01); *B23K 26/0626* (2013.01); *B23K 26/0643* (2013.01); *B23K 26/0648* (2013.01); *B23K 26/342* (2015.10); *B23K 26/346* (2015.10); *B29C 64/153* (2017.08); *B29C 64/268* (2017.08); *B33Y 10/00* (2014.12); *B33Y 30/00* (2014.12); *B22F 2003/1051* (2013.01); *B22F 2003/1056* (2013.01)

(58) Field of Classification Search
CPC .............................. B22F 3/1055; B33Y 10/00
USPC ....................................................... 75/10.19
See application file for complete search history.

(56) References Cited

U.S. PATENT DOCUMENTS

| | | |
|---|---|---|
| 4,863,538 A | 9/1989 | Deckard |
| 5,006,688 A | 4/1991 | Cross |

(Continued)

FOREIGN PATENT DOCUMENTS

| | | |
|---|---|---|
| CN | 204584274 U | 8/2015 |
| DE | 102012/207201 B3 | 4/2013 |

(Continued)

OTHER PUBLICATIONS

Barroi et al, "A Novel Approach for High Deposition Rate Cladding with Minimal Dilution with an Arc—Laseer Process Combina", Physics Procedia, Elsevier, vol. 41, Amsterdam, NL, Apr. 9, 2013, pp. 249-254.

(Continued)

*Primary Examiner* — Weiping Zhu
(74) *Attorney, Agent, or Firm* — Dority & Manning, P.A.

(57) ABSTRACT

A method of fabricating an object by additive manufacturing is provided. The method includes irradiating a portion of powder in a powder bed, the irradiation creating an ion channel extending to the powder. The method also includes applying electrical energy to the ion channel, wherein the electrical energy is transmitted through the ion channel to the powder in the powder bed, and energy from the irradiation and the electrical energy each contribute to melting or sintering the portion of the powder in the powder bed.

13 Claims, 5 Drawing Sheets

(51) Int. Cl.
  *B23K 26/06* (2014.01)
  *B29C 64/153* (2017.01)
  *B29C 64/268* (2017.01)

(56) References Cited

U.S. PATENT DOCUMENTS

| | | |
|---|---|---|
| 5,460,758 A | 10/1995 | Langer et al. |
| 5,496,983 A | 3/1996 | Hoshi |
| 6,388,227 B1 | 5/2002 | Dykhno et al. |
| 6,603,092 B2 | 8/2003 | Briand et al. |
| 6,608,285 B2 | 8/2003 | Lefebvre et al. |
| 8,842,358 B2 | 9/2014 | Bareman et al. |
| 9,522,436 B2 | 12/2016 | Freysz et al. |
| 9,578,695 B2 | 2/2017 | Jerby et al. |
| 2005/0006355 A1 | 1/2005 | De Dinechin et al. |
| 2006/0235564 A1 | 10/2006 | Troitski |
| 2012/0234802 A1 | 9/2012 | Wahl et al. |
| 2013/0126573 A1 | 5/2013 | Hosseini et al. |
| 2013/0148685 A1 | 6/2013 | Jones et al. |
| 2015/0053656 A1 | 2/2015 | Popp et al. |
| 2016/0175984 A1 | 6/2016 | Dalle et al. |
| 2017/0082124 A1 | 3/2017 | Kremeyer |
| 2017/0119470 A1 | 5/2017 | Diamant et al. |
| 2017/0203363 A1 | 7/2017 | Rowland et al. |
| 2017/0203364 A1 | 7/2017 | Ramaswamy et al. |

FOREIGN PATENT DOCUMENTS

| | | |
|---|---|---|
| DE | 112015/003334 T5 | 3/2017 |
| JP | S60234782 A | 11/1985 |
| JP | 2017/526815 A | 9/2014 |
| JP | 2014534561 A | 12/2014 |
| JP | 2015/202597 A | 11/2015 |
| JP | 2017/530251 A | 10/2017 |
| WO | WO99/31518 A1 | 6/1999 |
| WO | WO2011/029462 A1 | 3/2011 |

OTHER PUBLICATIONS

Extended European Search Report Corresponding to Application No. 18200507 dated Mar. 20, 2019.
Japanese Search Report Corresponding to Application No. 20180199809 dated Jan. 10, 2020.
Japanese Office Action Corresponding to Application No. 20180199809 dated Jan. 20, 2020.

APPLYING ELECTRIC PULSES THROUGH A LASER INDUCED PLASMA CHANNEL FOR USE IN A 3-D METAL PRINTING PROCESS

The present invention generally relates to an additive manufacturing (AM) method and apparatus to perform additive manufacturing processes. More specifically, the present invention relates to a method and apparatus for applying electric pulses through a laser induced plasma channel for use in a 3-D metal printing process. As such, a continuous process of additively manufacturing a large annular object or multiple smaller objects simultaneously, such as but not limited to components of an aircraft engine, may be performed.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758, which are incorporated herein by reference, describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is a diagram showing a cross-sectional view of an exemplary conventional system 100 for direct metal laser sintering ("DMLS") or direct metal laser melting (DMLM). The apparatus 100 builds objects, for example, the part 122, in a layer-by-layer manner by sintering or melting a powder material (not shown) using an energy beam 136 generated by a source 120, which can be, for example, a laser for producing a laser beam, or a filament that emits electrons when a current flows through it. The powder to be melted by the energy beam is supplied by reservoir 126 and spread evenly over a powder bed 112 using a recoater arm 116 travelling in direction 134 to maintain the powder at a level 118 and remove excess powder material extending above the powder level 118 to waste container 128. The energy beam 136 sinters or melts a cross sectional layer of the object being built under control of an irradiation emission directing device, such as a galvo scanner 132. The galvo scanner 132 may include, for example, a plurality of movable mirrors or scanning lenses. The speed at which the laser is scanned is a critical controllable process parameter, impacting how long the laser power is applied to a particular spot. Typical laser scan speeds are on the order of 10 to 100 millimeters per second. The build platform 114 is lowered and another layer of powder is spread over the powder bed and object being built, followed by successive melting/sintering of the powder by the laser 120. The powder layer is typically, for example, 10 to 100 microns. The process is repeated until the part 122 is completely built up from the melted/sintered powder material.

The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

Current selective laser melting 3-D printing processes have many disadvantages when compared with standard manufacturing processes. These disadvantages include, for example, reduced strength due to non-complete sintering of metal powder particles (common for AM processing) and high levels of residual stresses due to highly concentrated localized heat application. Other disadvantages pertain to porosity issues which have recently been observed in the development of cold plates used to cool high power electronic power conversion products that provide thermal management to SiC electronic components.

FIG. 2 is an illustration of laser power applied to a target in accordance with conventional methods and apparatuses of additive manufacturing. A laser power supply such as the laser power supply in FIG. 2, for example, may emit approximately 80 watts of power. Conversion of electrical energy to laser typically results in a 75 percent loss in power. That is, only 25 percent of the power supplied to the 80 watt laser (i.e., 20 watts) is converted to energy reaching the powder bed. An additional loss of 30 percent loss occurs upon melting powder using the laser. That is, only 70 percent of the laser's 20 watts (i.e., 14 watts) is utilized to melt the metal powder.

Thus, conventional lasers used in AM are inefficient. There remains a need to increase the heating efficiency of lasers used in AM along with a more rapid manufacturing process.

SUMMARY

The following presents a simplified summary of one or more aspects of the present disclosure to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

The foregoing and/or other aspects of the present invention may be achieved by a method of fabricating an object by additive manufacturing. In one aspect, the method includes irradiating a portion of powder in a powder bed, wherein the irradiation creates an ion channel extending to the powder. The method also includes applying electrical energy to the ion channel, wherein the electrical energy is transmitted through the ion channel to the powder in the powder bed, wherein energy from the irradiation and the electrical energy each contribute to melting or sintering the portion of the powder in the powder bed.

The foregoing and/or other aspects of the present invention may be achieved by an apparatus for additive manufacturing an object. The apparatus includes a powder dispenser, a platform on which the object is built in a powder bed, and an irradiation source irradiating a portion of powder in the powder bed, the irradiation creating an ion channel extending to the powder. The apparatus also includes a power source applying electrical energy to the ion channel, the electrical energy being transmitted through the ion channel to the powder in the powder bed. Energy from the irradiation and the electrical energy each contribute to melting or sintering the portion of the powder in the powder bed.

The foregoing and/or aspects of the present invention may also be achieved by a method of fabricating an object by additive manufacturing. In one aspect, the method includes (a) depositing a given layer of powder in a powder bed; (b) irradiating the given layer of powder in the powder bed, wherein the irradiation creates an ion channel extending to the given layer; (c) applying electrical energy to the ion channel, wherein the electrical energy is transmitted through the ion channel to the given layer of powder in the powder bed; (d) depositing a subsequent layer of powder; and (e) repeating steps (a)-(d) until the object is formed in the powder bed.

Other features and aspects may be apparent from the following detailed description, the drawings, and the claims.

BRIEF DESCRIPTION OF THE DRAWINGS

The accompanying drawings, which are incorporated into and constitute a part of this specification, illustrate one or more example aspects of the present disclosure and, together with the detailed description, explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. For example, the present invention provides a preferred method for additively manufacturing metallic components or objects, and preferably these components or objects are used in the manufacture of jet aircraft engines. In particular, large, annular components of jet aircraft engines can be advantageously produced in accordance with this invention. However, other components of an aircraft and other non-aircraft components may be prepared using the apparatuses and methods described herein.

According to an aspect, the present invention provides a method of applying electric pulses through a laser induced plasma channel to improve the consolidation of powder metal by reducing residual stresses during the DMLS process. For example, the method may include irradiating a portion of powder in a powder bed, wherein the irradiation creates an ion channel extending to the powder. The method may also include applying electrical energy to the ion channel, wherein the electrical energy is transmitted through the ion channel to the powder in the powder bed, and wherein energy from the irradiation and the electrical energy each contribute to melting or sintering the portion of the powder in the powder bed. In addition, the laser as in the application of a laser operating in the ultraviolet portion of the electromagnetic spectrum is used solely to create the plasma channel for the electrical pulse to pass through. According to an exemplary embodiment, the electrical pulse is used for the sintering and melting process without the aid of the laser for assisting in the sintering and melting process.

Figure 1:
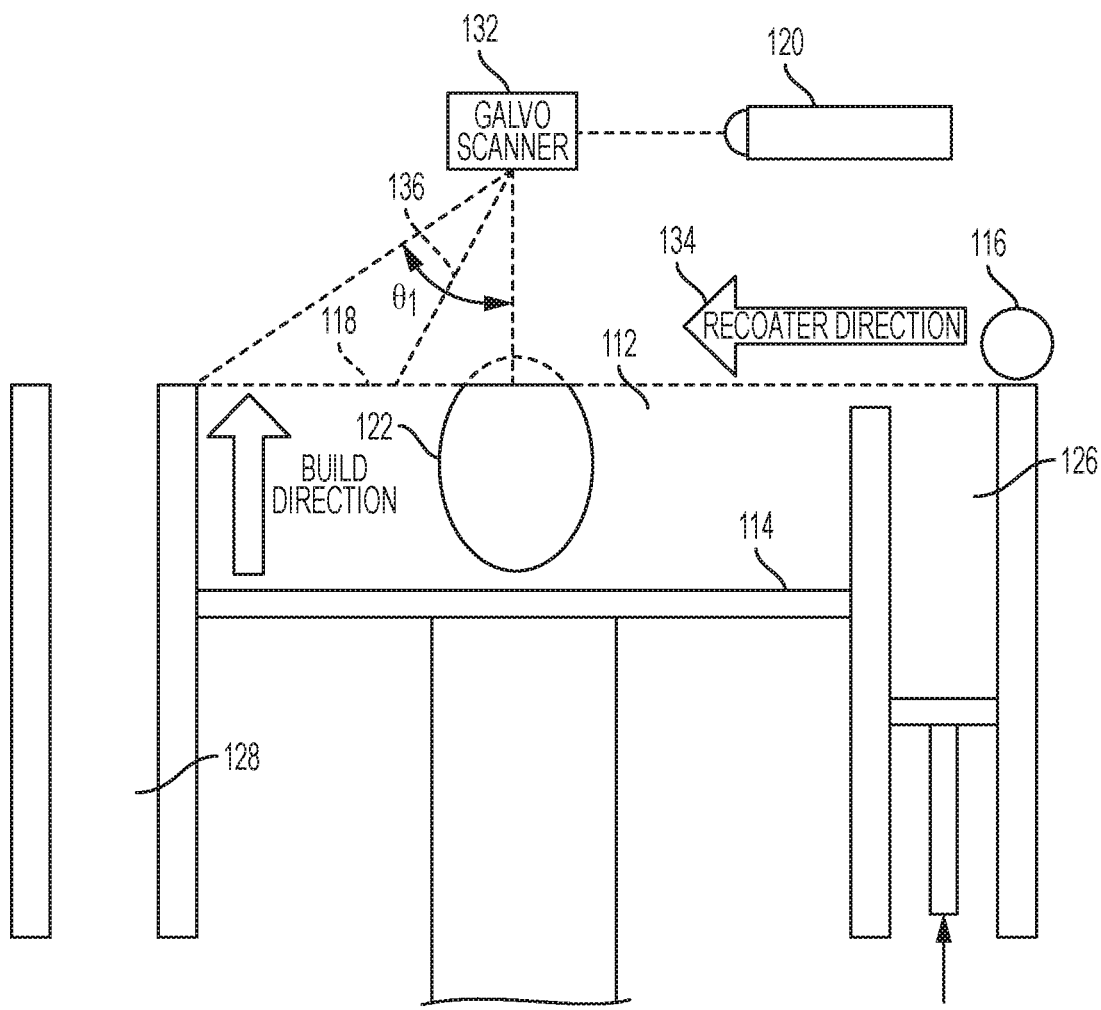
FIG. 1 is an illustration of a conventional apparatus for DMLM using a powder bed.
Figure 2:
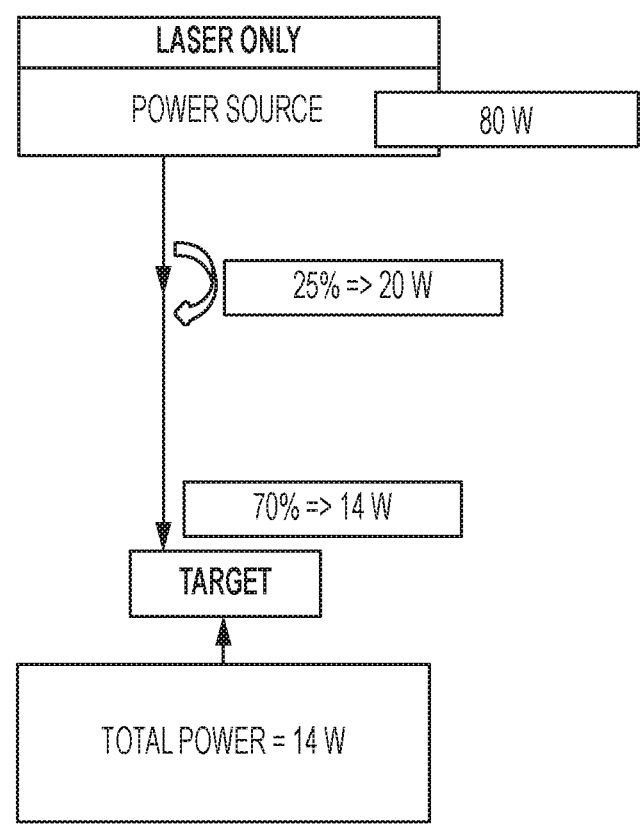
FIG. 2 is an illustration of laser power applied to a target in accordance with conventional methods and apparatuses of additive manufacturing.
Figure 3:
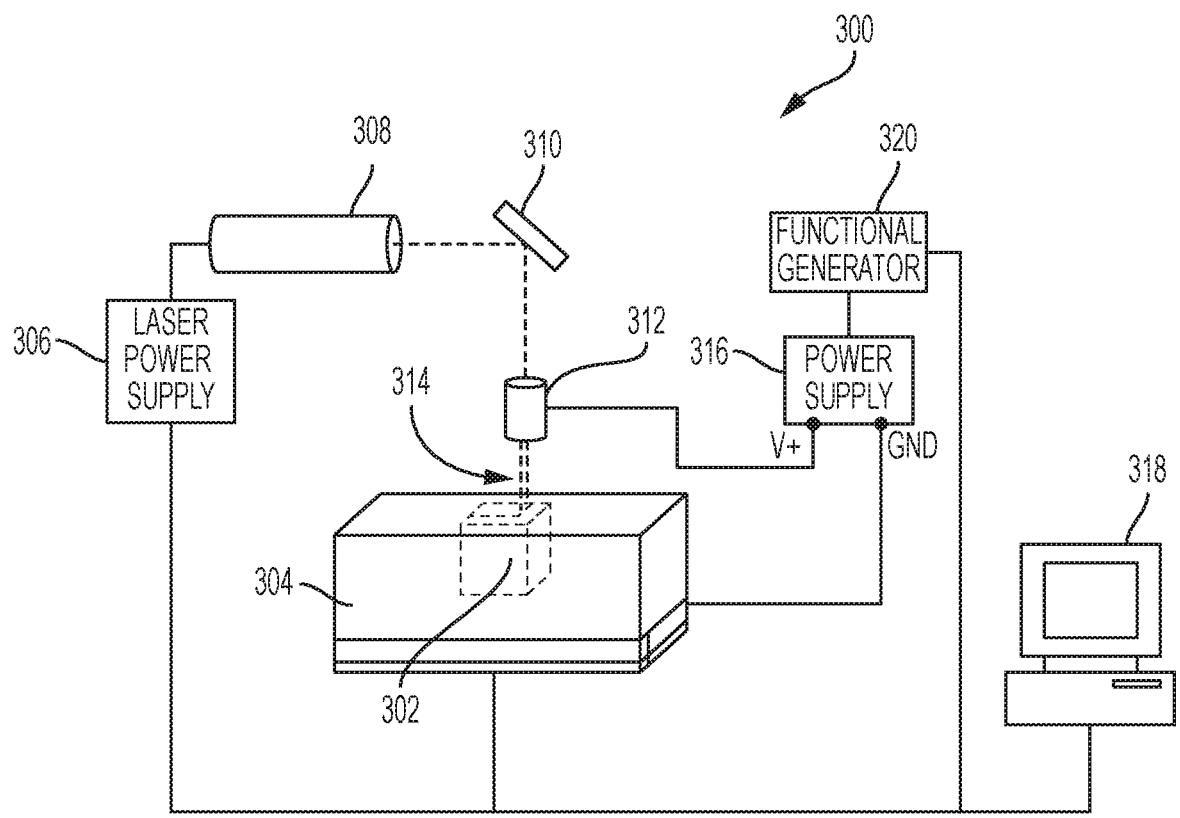
FIG. 3 is an illustration of an additive manufacturing apparatus according to an embodiment of the present invention.

FIG. 3 is an illustration of an additive manufacturing apparatus, according to an embodiment of the present invention. In FIG. 3, an apparatus 300 may be provided to build a part 302 layer-by-layer in a powder bed 304. The part 302 may be built by using a laser power supply 306. The laser power supply 306 supplies power to a laser 308 that emits a beam to mirror 310. The beam reflects off the mirror 310 to a conductive element 312. The conductive element 312 may be, for example, an optical lens or mirror capable of focusing the energy of the laser beam emitted by the laser 308. The apparatus 300 also includes a power supply 316 to provide an electric pulse to the conductive element 312. The power supply 316 has a positive voltage source V+ at one end connected to the conductive element 312 for providing the electric pulse to the conductive element 312. The other end of the power supply 316 is grounded GND and connected to the powder bed 304. The laser power supply 306 and the power supply 316 may be connected to a functional generator 320 and controlled by a programmable controller 318. The controller 318 may be, for example, a programmable proportional, integral, differential controller that provides dual laser and electrical power pulse control.

According to an aspect, the laser 308 emits the laser beam into a volume of air space above the powder bed 304. The laser beam emitted by the laser 308 rapidly excites and ionizes surrounding gases, atoms and forms an ionization path to guide the electric pulses provided by the power supply 316. The ionized surrounding gases form plasma which forms an electrically conductive uniform plasma channel 314. The electric pulses provided by the power supply 316 may then be applied through the plasma channel 314 to heat and bond metal powder in the powder bed 304 to build the part 302. Thus, according to the exemplary embodiment, when electric pulses are applied to metals undergoing deformation by optional laser heating, the deformation resistance may be significantly reduced with increased plasticity. It may be appreciated that the laser beam and electric pulse may be applied simultaneously or staggered one after the other, after a short delay.

Figure 4:
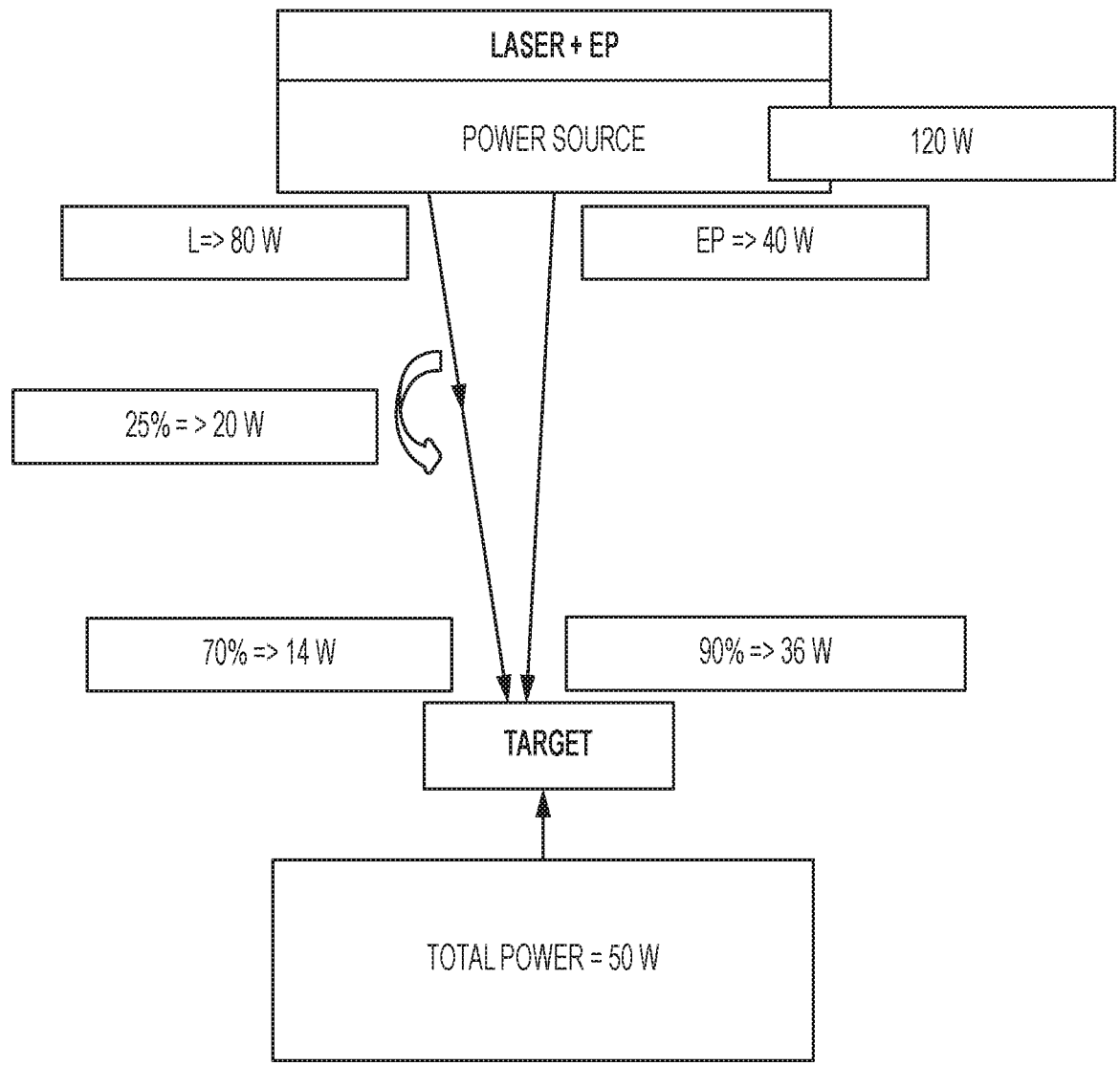
FIG. 4 is an illustration of laser and electric power applied to a target according to an embodiment of the present invention.

FIG. 4 is an illustration of a laser and electric power supply of 120 watts applied to a target according to an embodiment of the present invention. As shown in FIG. 4, a laser power supply having 80 watts and an electric power supply having 40 watts may combine to apply 120 watts of power to a target according to an exemplary embodiment of the present invention. Due to the losses associated with converting electrical energy to a laser beam, only approximately 25 percent of the power emitted by the 80 watt laser power supply may be utilized (i.e., 20 watts). When the laser power reaches the target, approximately 70 percent of the 20 watts from the laser is utilized melting the powder; that is, approximately 14 watts of power applied from the 80 watt laser power supply. According to an aspect, the electric power supply may apply an electric pulse of 40 watts to the laser induced plasma channel created by the 80 watt laser power supply. Approximately 90% of the 40 watts applied from the electric power supply may be utilized (i.e., 36 watts) at the powder bed. As such, the 36 watts of power from the electric power supply combined with the 14 watts of power from the laser power supply allows for 50 watts of total power to be applied to melt the target in accordance with the exemplary embodiment of the present invention. Thus, additive manufacturing in accordance with the present exemplary embodiment using electric pulses through a laser induced plasma channel, may apply approximately four times more heat to a target than conventional additive manufacturing methods.

Figure 5:
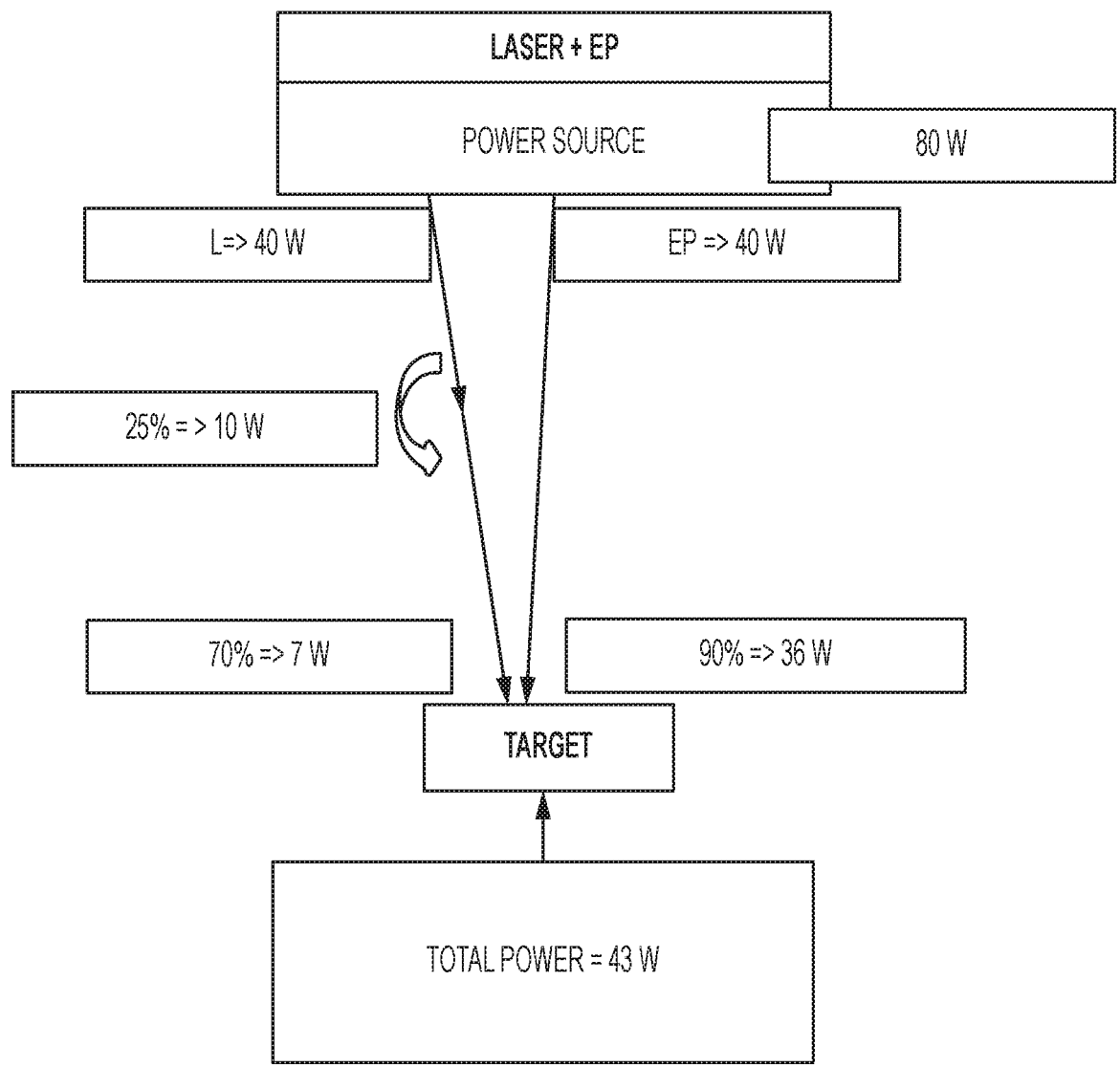
FIG. 5 is an illustration of laser and electric power applied to a target according to another embodiment of the present invention.

FIG. 5 is an illustration of a laser and electric power supply of 80 watts applied to a target according to another embodiment of the present invention. As shown in FIG. 5, a laser power supply having 40 watts and an electric power supply having 40 watts may combine to apply 80 watts of power to a target according to an exemplary embodiment of the present invention. Due to the loss of power associated with converting electrical energy to a laser beam, only approximately 25 percent of the power emitted by the 40 watt laser power supply is utilized (i.e., 10 watts) at the powder bed. When the laser power reaches the target, approximately 70 percent of the 10 watts utilized may be applied to melt the target; that is, approximately 7 watts of power from the 40 watt laser power supply. According to an aspect, the electric power supply may apply an electric pulse of 40 watts to the laser induced plasma channel created by the 40 watt laser power supply. Approximately 90% of the 40 watts applied from the electric power supply may be utilized (i.e., 36 watts). As such, the 36 watts of power from the electric power supply combined with the 7 watts of power from the laser power supply allows for 43 watts of total power to be applied to melt the target in accordance with the exemplary embodiment of the present invention. In this exemplary embodiment, approximately three times more heat may be applied to a targeted area than conventional additive manufacturing methods.

In accordance with the above-described, the present invention provides a 3-D printing process that may increase reliability of the manufactured part, improve the mechanical properties of printed metal parts, and improve efficiency of the selective sintering process. The present invention may provide several advantages of using additive manufacturing for 3-D metal printing such as, but not limited to, reduced deformation resistance, improved plasticity, simplified processes, increased system electrical energy efficiency, lower cost through improved yield, lowered product defects minimizing voids, and improved affected metal properties.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of fabricating an object by additive manufacturing, comprising:
 irradiating a portion of powder in a powder bed, wherein the irradiation creates an ion channel extending to the powder; and
 applying electrical energy to the ion channel, wherein the electrical energy is transmitted through the ion channel to the powder in the powder bed, wherein energy from the irradiation and the electrical energy each contribute to melting or sintering the portion of the powder in the powder bed.

2. The method of claim 1, wherein the energy from the irradiation is emitted by a laser power supply.

3. The method of claim 1, wherein the ion channel is a laser induced plasma channel.

4. The method of claim 1, wherein the electrical energy is supplied by an electrical power supply.

5. The method of claim 1, wherein the electrical energy is an electric pulse.

6. The method of claim 1, wherein the energy from the irradiation and electrical energy are controlled to contribute to the melting or sintering the portion of the powder in the powder bed simultaneously.

7. The method of claim 1, wherein the energy from the irradiation and electrical energy are controlled to contribute to the melting or sintering the portion of the powder in the powder bed consecutively.

8. A method of fabricating an object by additive manufacturing, comprising:
 (a) depositing a given layer of powder in a powder bed;
 (b) irradiating the given layer of powder in the powder bed, wherein the irradiation creates an ion channel extending to the given layer;
 (c) applying electrical energy to the ion channel, wherein the electrical energy is transmitted through the ion channel to the given layer of powder in the powder bed;

(d) depositing a subsequent layer of powder; and
(e) repeating steps (a)-(d) until the object is formed in the powder bed.

9. The method of claim 8, wherein energy from the irradiation and the electrical energy each contribute to melting or sintering a portion of the powder in the powder bed.

10. The method of claim 8, wherein the energy from the irradiation is emitted by a laser power supply.

11. The method of claim 8, wherein the electrical energy is supplied by an electrical power supply.

12. The method of claim 8, wherein the energy from the irradiation and electrical energy are controlled to contribute to the melting or sintering the portion of the powder in the powder bed simultaneously.

13. The method of claim 8, wherein the energy from the irradiation and electrical energy are controlled to contribute to the melting or sintering the portion of the powder in the powder bed consecutively.

* * * * *